Sept. 20, 1938.  W. LEGGETT  2,130,961
BEAN AND CLOVER SEED DRIER
Filed Jan. 26, 1937
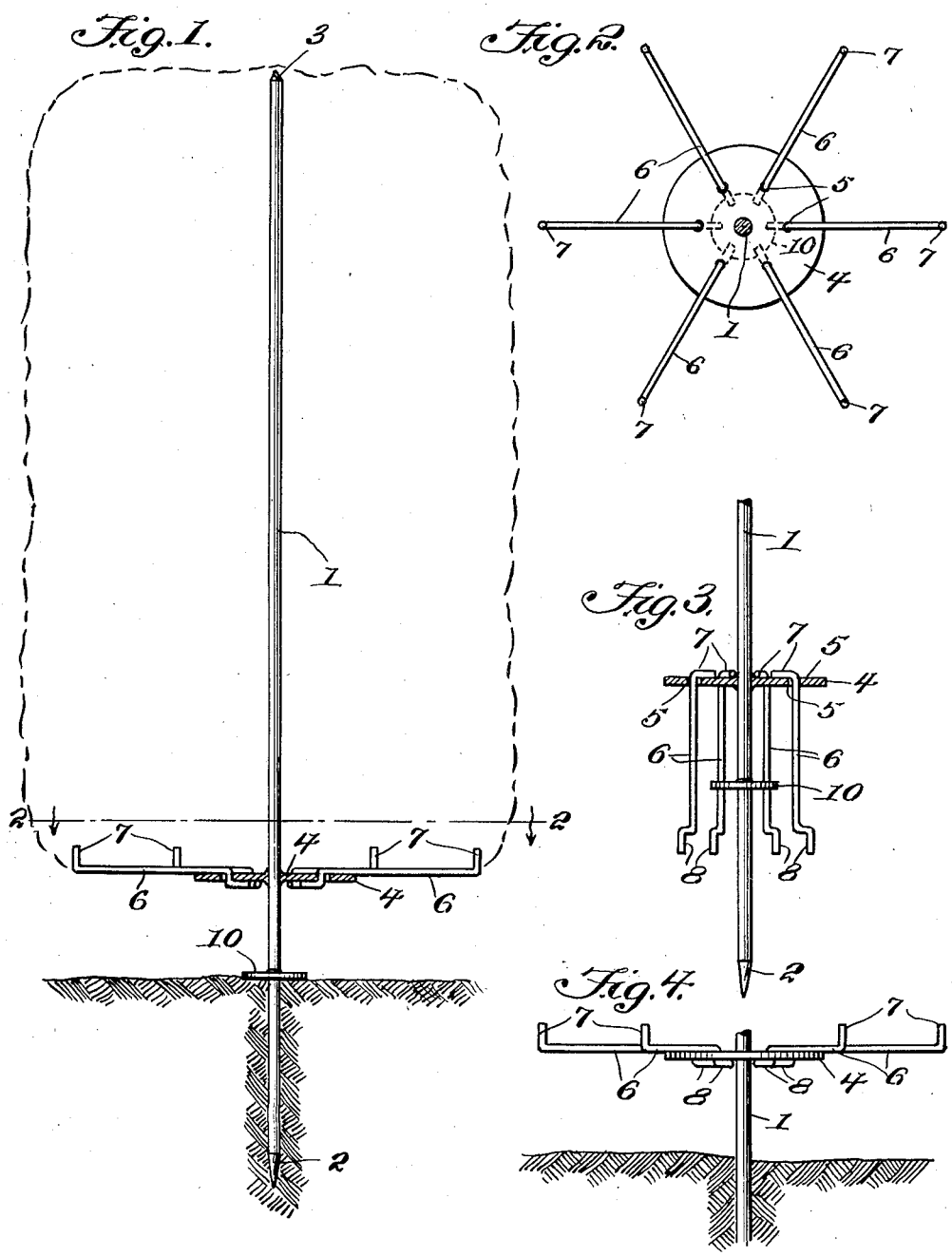
William Leggett
INVENTOR
BY Victor J. Evans & Co.
ATTORNEYS Patented Sept. 20, 1938

2,130,961

UNITED STATES PATENT OFFICE 2,130,961

BEAN AND CLOVER SEED DRIER

William Leggett, Sandusky, Mich.

Application January 26, 1937, Serial No. 122,436

1 Claim. (Cl. 211—29)

This invention relates to driers especially adapted for curing growth and seeds thereof such as clover, beans, alfalfa and the like to prevent deterioration thereof caused by being rained upon and allowed to rest directly on the ground whereby sweating and molding will develop and destroy and render the beans unmarketable. The present invention has for the primary object the provision of portable devices which may be readily set up in a field and on which growth containing the seeds may be stacked to support the growth spaced from the ground and thereby permit free circulation of air entirely about the stack for preventing molding and deterioration, permitting the curing of said growth and seeds to be successfully carried out even when rained upon and which will eliminate the present practice of turning over the growth as when stacked on the ground for curing.

With these and other objects in view, this invention consists in certain novel features of construction, combination and arrangement of parts to be hereinafter more fully described and claimed.

For a complete understanding of my invention, reference is to be had to the following description and accompanying drawing, in which—

Figure 1 is a side elevation illustrating a drier constructed in accordance with my invention.

Figure 2 is a sectional view taken on the line 2—2 of Figure 1.

Figure 3 is a fragmentary side elevation, partly in section, showing the folding of the drier.

Figure 4 is a fragmentary side elevation illustrating a modified form of my invention.

Referring in detail to the drawing, the numeral 1 indicates a rod having each end pointed, as shown at 2 and 3. The pointed end 2 of the rod is to facilitate the insertion of said rod in the ground, as shown in Figure 1, while the pointed end 3 is to facilitate the passing of the rod through growth or foliage for stacking said growth or foliage on the rod, this also being clearly shown in Figure 1. Secured to the rod 1 is a plate 4 provided with a series of openings 5 through which extend a plurality of arms 6. The arms 6 may be extended radially with respect to the plate and cooperate therewith in forming a base for supporting the stack of growth or foliage on the rod and in spaced relation to the ground or the arms may be moved into a position to depend from the plate and parallel the rod 1, as shown in Figure 3. One end of each arm 6 is bent at right angles to form a hook 7 which will prevent the arm from passing through the opening of the plate when in a depending position and when the arm is in a horizontal position to extend into the stack of foliage or growth and aid in preventing the stack from moving off of the arm. The other end of each arm is bent, as shown at 8, to underlie the plate when said arm is disposed horizontally and which will act in maintaining the arm in a horizontal position. However, the end 8 of the arm will permit said arm to be swung vertically and slid relative to the plate until the hook end 7 contacts the plate. The ends 7 and 8 of the arms prevent detachment of said arms from the plate when the arms are in either of their positions. A stack of growth or foliage supported on the rod 1, as shown in Figure 1 will permit air to circulate entirely about the stack and prevent the growth from molding or sweating by lying on the ground, consequently permitting the growth and the seeds thereof to cure even when subjected to rain or dampness.

A stop plate 10 may be secured to the rod 1 below the plate 4 to engage the surface of the ground for limiting the distance the rod may be inserted.

What is claimed is:

A drier comprising a rod to be inserted centrally into a stack of clover growth and having one end insertable into the ground for disposing said rod vertically, a circular shaped plate formed on the rod and abutting the stack of clover growth and spaced a limited distance from the ground and having openings spaced from the edges thereof, a plurality of rod-like arms engaging the stack by extending radially from said plate and having the outer ends thereof bent angularly and disposed vertically to embed into the stack of the clover growth and cooperate with the plate in limiting the downward movement of the stack of clover growth on the rod toward the ground, said arms resting on the plate and having portions offset to extend through the openings and engage the under face of the plate, and adapted to permit said arms to be slid in the openings and bring the angularly related outer ends into engagement with the top face of the plate for supporting said arms in a depending position from the plate and grouped about the rod when the stack of clover growth is removed from the rod and the latter from the ground.

WILLIAM LEGGETT.